(12) United States Patent
Akselrod et al.

(10) Patent No.: US 11,060,876 B2
(45) Date of Patent: Jul. 13, 2021

(54) ASSESSING ENVIRONMENTAL CONDITIONS AND ADMINISTERING A MODIFICATION TO SELF DRIVEN VEHICLES

(71) Applicant: INTERNATIONAL BUSINESS MACHINES CORPORATION, Armonk, NY (US)

(72) Inventors: Ben Z. Akselrod, Givat Shmuel (IL); Anthony Di Loreto, Markham (CA); Steve McDuff, Markham (CA); Kyle D. Robeson, North York (CA)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 15/809,082

(22) Filed: Nov. 10, 2017

(65) Prior Publication Data

US 2019/0145787 A1    May 16, 2019

(51) Int. Cl.
*G01C 21/34* (2006.01)
*G07C 5/00* (2006.01)
*G05D 1/02* (2020.01)
*G01C 21/36* (2006.01)

(52) U.S. Cl.
CPC ..... *G01C 21/3461* (2013.01); *G01C 21/3407* (2013.01); *G01C 21/3415* (2013.01); *G01C 21/3691* (2013.01); *G01C 21/3697* (2013.01); *G05D 1/0214* (2013.01); *G07C 5/006* (2013.01); *G05D 2201/0213* (2013.01)

(58) Field of Classification Search
None
See application file for complete search history.

(56) References Cited

U.S. PATENT DOCUMENTS

| 9,466,154 B2 | 10/2016 | Akselrod et al. |
| 10,386,192 B1 * | 8/2019 | Konrardy .............. B60R 25/252 |
| 2002/0049523 A1 | 4/2002 | Diaz et al. |
| 2014/0107894 A1 | 4/2014 | Obradovich |

(Continued)

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Nicholas K Wiltey
(74) *Attorney, Agent, or Firm* — Michael A. Petrocelli

(57) ABSTRACT

A method, system and computer program product provide assessing environmental conditions outside an autonomous vehicle and recommending modifications for the autonomous vehicle based on a condition. A plurality of possible routes are determined for an autonomous vehicle using a navigational system. Environmental conditions are assessed, and one or more environmental conditions are identified outside the autonomous vehicle related to each of the plurality of possible routes. A determination is made as to when the one or more environmental conditions necessitate a modification of the autonomous vehicle for traveling the respective possible route. One of the possible routes are selected based on a criteria which includes avoiding a greatest number of the environmental conditions which necessitate the modification. The autonomous vehicle is routed along the selected route to a service station for implementing the modification based on the condition related to the selected route.

20 Claims, 9 Drawing Sheets

(56) References Cited

U.S. PATENT DOCUMENTS

| | | | |
|---|---|---|---|
| 2014/0309864 A1* | 10/2014 | Ricci | A61B 5/0077 |
| | | | 701/36 |
| 2016/0139594 A1* | 5/2016 | Okumura | B60W 30/00 |
| | | | 701/2 |
| 2016/0225198 A1 | 8/2016 | Punjabi et al. | |
| 2019/0016341 A1* | 1/2019 | Nelson | B60W 40/06 |

* cited by examiner

ASSESSING ENVIRONMENTAL CONDITIONS AND ADMINISTERING A MODIFICATION TO SELF DRIVEN VEHICLES

BACKGROUND

The present disclosure relates to a method and system for assessing environmental conditions and monitoring self-driven vehicles or autonomous vehicles, and more specifically relates to assessing environmental conditions and administering a modification to self-driven vehicles or autonomous vehicles.

A vehicle or car may need a modification for traveling roads in certain geographical areas or venues, and/or in relation to environment conditions such as weather conditions. For example, a modification can include a tire change, for snow tires or removing and replacing snow tires. On some roads, in a geographical area, and under certain weather conditions which are occurring or predicted, vehicles can require or be advised to undergo a modification. For example, under certain environmental conditions or weather conditions for a geographical area, vehicles could have chains installed on tires of a vehicle in order to drive safely. Typically, such modifications are done by a vehicle driver or initiated by the driver.

Self-driven or autonomous vehicles or cars may need a modification for traveling roads in certain geographical areas or venues, and/or in relation to environment conditions such as weather conditions. Since there is not a person driving the autonomous vehicle to initiate and complete the modification by either completing the modification themselves or engaging a service station, a vehicle modification needs to be planned, initiated, and implemented alternatively as compared to using a driver.

SUMMARY

In one example, for an autonomous vehicle, environmental conditions such as weather conditions are assessed, and a determination can be made as to whether a modification to the vehicle is requires, suggested, recommended, or advised. When a decision is made that the modification is to be implemented, the modification can be planned, initiated, and implemented. For example, a modification can include a tire change, for snow tires or removing and replacing snow tires, or installing chains on tires.

According to aspects of the present invention, a method, system and computer program product provide assessing environmental conditions outside an autonomous vehicle and recommending modifications for the autonomous vehicle based on a condition. A plurality of possible routes are determined for an autonomous vehicle using a navigational system having a computer communicating with a computer in the autonomous vehicle. The autonomous vehicle has a start location and a destination. Environmental conditions are assessed outside the autonomous vehicle for each of the possible routes, and the environmental conditions include weather conditions. One or more environmental conditions are identified outside the autonomous vehicle related to each of the plurality of possible routes. A determination is made as to when the one or more environmental conditions necessitate a modification of the autonomous vehicle for traveling the respective possible route. One of the possible routes are selected based on a criteria which includes avoiding a greatest number of the environmental conditions which necessitate the modification. The autonomous vehicle is routed along the selected route to a service station for implementing the modification based on the condition related to the selected route. The modification is implemented to the autonomous vehicle, and the routing of the autonomous vehicle continues along the selected route to the destination.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawing are discussed forthwith below.

DETAILED DESCRIPTION

Figure 1:
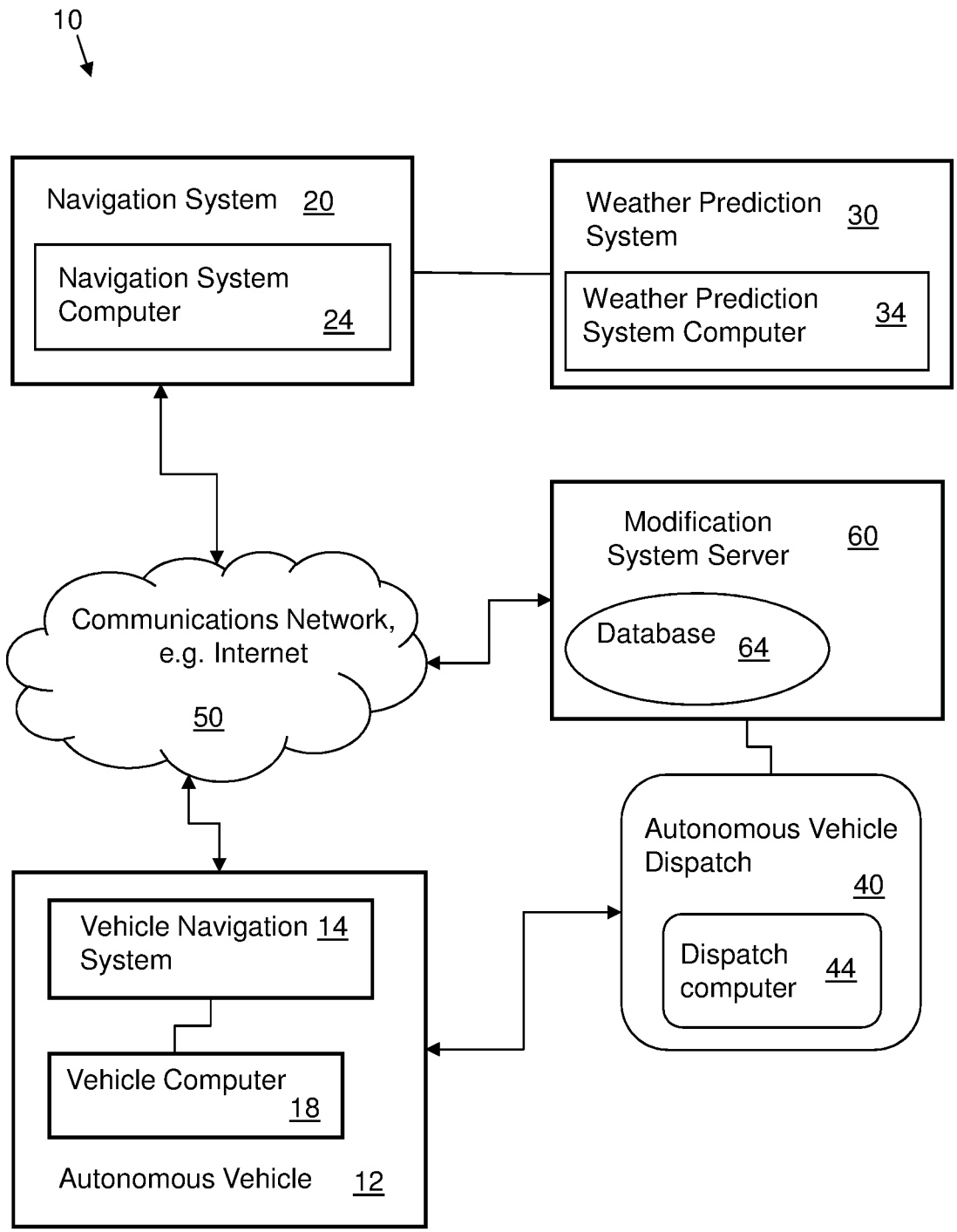
FIG. 1 is a schematic block diagram illustrating an overview of a system and methodology for assessing environmental conditions outside an autonomous vehicle, recommending modifications for the autonomous vehicle based on a condition, and implementing a modification, according to an embodiment of the disclosure.
Figure 2A:
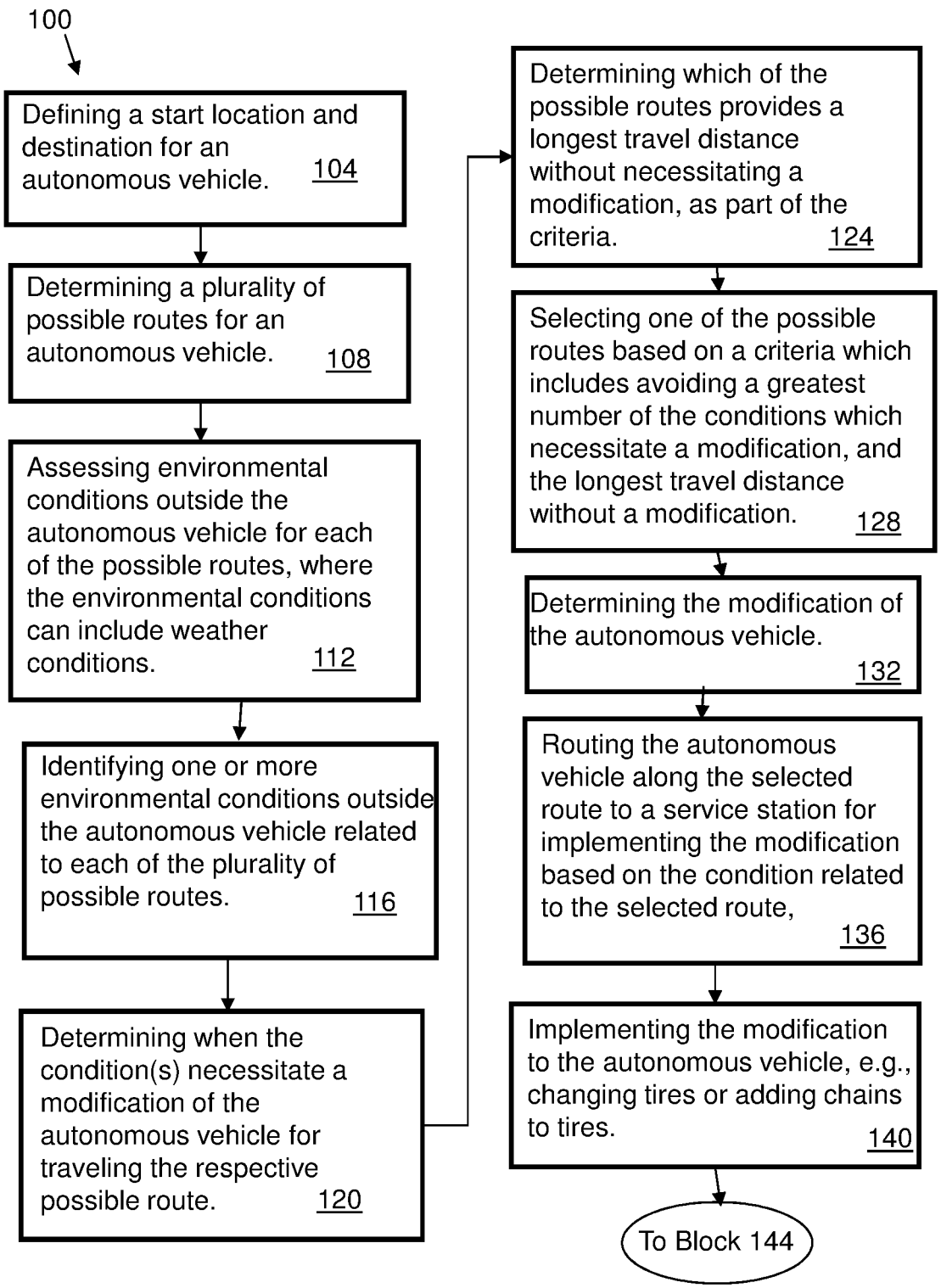
FIG. 2A is a flow chart illustrating a method, implemented using the system shown in FIG. 1, for assessing environmental conditions and recommending modifications for an autonomous vehicle, according to an embodiment of the disclosure.
Figure 2B:
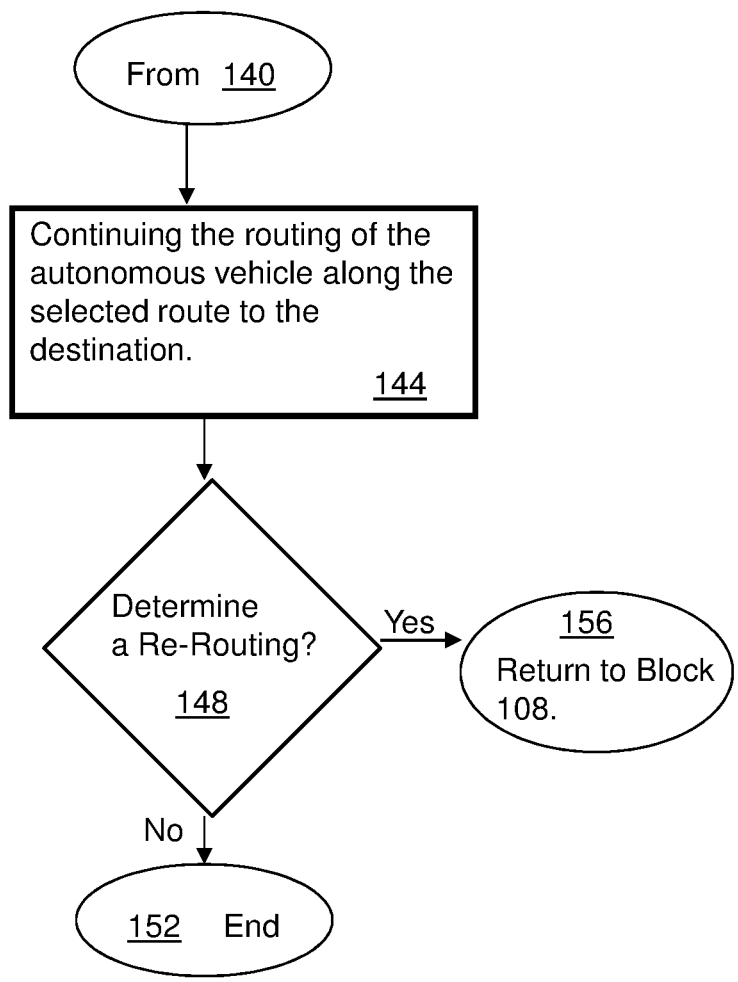
FIG. 2B is a flow chart continuing the method from FIG. 2A.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Referring to FIGS. 1, 2, 3, and 4, a method 100 with reference to a system 10 according to an embodiment of the present disclosure is provided for assessing environment conditions outside an autonomous vehicle and recommending modification for the autonomous vehicle based on a condition. In describing the method 100 and system 10 of the present disclosure, reference is also made to a functional or operational schematic block diagram depicting a functional system 300 in FIG. 4, which elaborates on the system 10 shown in FIG. 1.

The method includes defining a start location and a destination for an autonomous vehicle 12, as in block 104. A plurality of possible routes 304 for the autonomous vehicle 12 are determined based on the start location 308 and the destination 312, as in block 108 of the method 100. The autonomous vehicle 12 includes a vehicle navigation system 14 communicating with a vehicle computer 18. The plurality of possible routes for the vehicle can be determined using the vehicle navigational system 14 communicating with the vehicle computer 18. The vehicle navigation system 14 can communicate with a navigation system 20 having a navigation system computer 24, which also communicates with a weather prediction system 30 having s weather prediction system computer 34. Communications between the navigation system 20 and the autonomous vehicle 12, and the modification system server 60 can occur via a communications network 50, including the Internet, or satellite communications systems including global positioning systems (GPS).

The method includes assessing environmental conditions 320 outside the autonomous vehicle for each of the possible routes, as in block 112. Such environmental conditions can include: weather conditions; temperature; road conditions; hill gradients; and road altitude.

The weather conditions can include, but are not intended to be limited to, rainy weather, and how much rain, as this can affect a determination of types and tread on a tire. Further, the weather conditions can include snow fall, including forecast of snow and exiting snow on the roadway or both. The environmental conditions can further include, road conditions, such as the existence of potholes, or lack of pavement which may be better traveled using different tires on the autonomous vehicle.

One or more environmental conditions are identified outside the autonomous vehicle related to each of the plurality of possible routes, at block 116. The method 100 continues to determine when the condition(s) identified at block 116 necessitate, or as considered, are determined to result in initiating a modification of the autonomous vehicle for traveling the respective possible route, at block 120.

As part of the criteria, the method can include determining which of the possible routes provides a longest travel distance without necessitating the modification, as in block 124. For example, a route may have a longest distance without requirement a modification, and thus the autonomous vehicle can travel the longest distance without implementing the modification. For example, if the modification is applying chains to tires in snowy or bad weather conditions, it would be desirable, (for example, based on travel speed and gas mileage) to travel the longest distance without the modification, i.e., applying chains to the tires. The route can be segmented or sectioned as a part before the modification and a part after the modification, or a part without the modification and a part with the modification. Thus, the method can maximize the length of a part of the route without the modification, in this example, without chains being applied to the tires. Thereby, maximizing travel speed and gas mileage.

The method further includes selecting one of the possible routes based on a criteria which includes avoiding a greatest number of the conditions which necessitate a modification to the autonomous vehicle (determined at block 120), and the longest travel distance without a modification (determined at block 124), as in block 128. For example, a route may include several modifications if the route is taken, while a another route would only include one modification.

The method determines the modification 330 of the autonomous vehicle for the selected route based on the environmental condition, at block 132.

The autonomous vehicle is routed along the selected route to a service station 340 for implementing the modification based on the condition related to the selected route, at block 136.

The method includes implementing the modification to the autonomous vehicle at the service station, at block 140. After the modification is completed 344, the method continues the routing of the autonomous vehicle along the selected route to the destination, as in block 144 in FIG. 2B.

In one example, the autonomous vehicle can arrive at the service station, wait for service, receive a signal that the modification is completed (for example, chains applied to tires). Once the signal is received that the modification is complete, the autonomous vehicle can continue on the route to its destination. The monitoring and guidance of the vehicle can be implemented by the autonomous vehicle dispatch 40 having a dispatch computer 44 and which communicates with the vehicle navigation system 14, and vehicle computer 18 of the autonomous vehicle 12 to guide and monitor the vehicle.

The method determines if a re-routing 352 is needed, for instance when another modification is needed, at block 148. If a re-routing is not needed, the method ends at block 152. If a re-routing is needed for another modification, the method goes to block 156 where the method returns to block 108 to determine a plurality of possible routes.

In one example, the routing of the autonomous vehicle along the selected route to the service station for implementing the modification based on the condition related to the selected route, can be a first selected route to a first service station. The implementing of the modification to the autonomous vehicle is a first modification based on a first condition related to the first selected route. In this example, the method includes routing the autonomous vehicle along a second selected route 352 to a second service station for implementing a second modification based on a second condition related to the second selected route. Once at the second service station, the second modification can be implemented to the autonomous vehicle. The vehicle is routed to or continues along a selected route to a destination.

Figure 3:
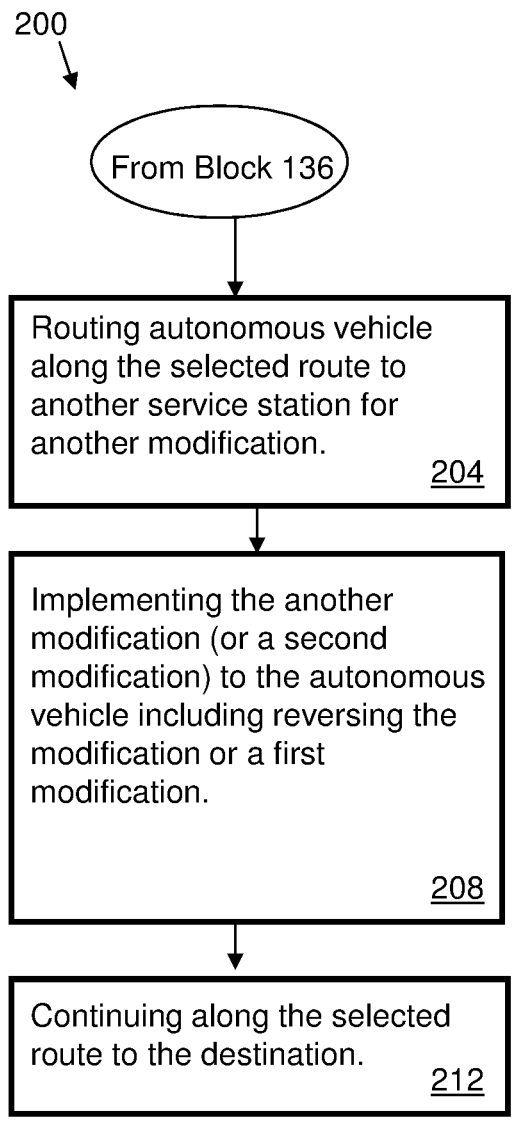
FIG. 3 is a flow chart of a method according to another embodiment of the disclosure which continues from the method of FIG. 2A.
Figure 4:
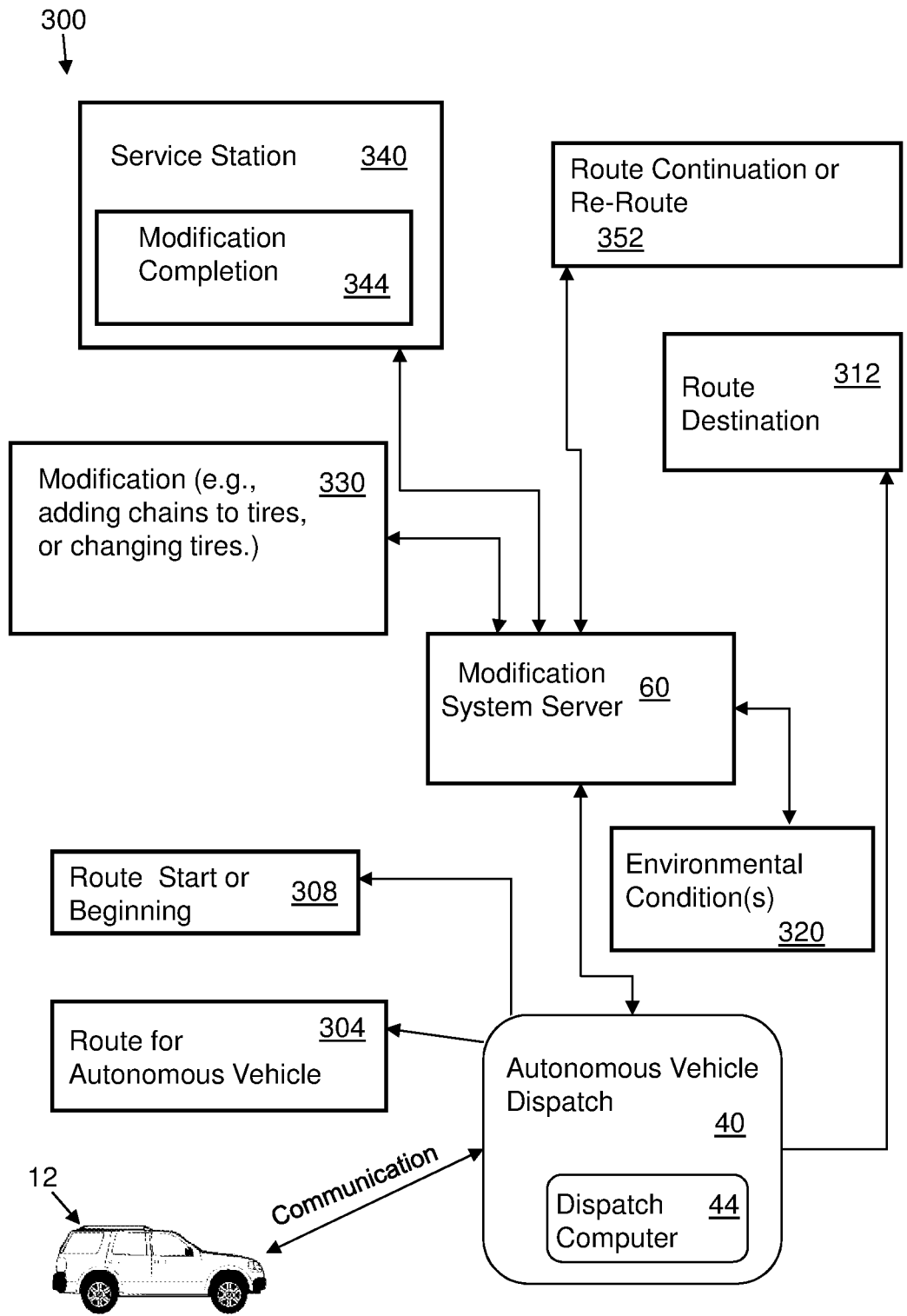
FIG. 4 is a functional block diagram depicting a system for assessing environmental conditions and recommending modifications for an autonomous vehicle according to the method and system shown in FIGS. 1, 2A, 2B, and 3 according to an embodiment of the disclosure.

Referring to FIG. 3, in a further example according to the embodiments of the present disclosure, a method 200 can be applied which continues from the method 100 (block 136). After the modification has been implemented (block 132, FIG. 2A), and the autonomous vehicle continues along the selected route to the destination (block 136, FIG. 2A), the autonomous vehicle can be routed along the selected route to another service station for another modification (or a second modification) based on a lack of the condition related to the selected route (block 204). The method includes implementing the another modification to the autonomous vehicle including reversing the modification (or a first modification), at block 208. The autonomous vehicle can then continue along the selected route to the destination, as in block 212.

In one example, as discussed above, the modification (completed at block 140) can be reversed, for example, chains can be taken off or removed from the tires. Other modifications can be implemented before reaching the destination as needed by the autonomous vehicle dispatch 40. Such modifications can include further modification based on weather conditions, such as snow tires. Other modifications can be based on road condition such as an unpaved road, e.g., a gravel road, which may require a tire change, or steep terrain or a steep road gradient, which could necessitate a tire change. In another example, outside temperature can necessitate a modification to the autonomous vehicle, such as covering a radiator (partial or otherwise) to compensate for the cold weather.

In one example, the autonomous vehicle dispatch 40 communicates with a modification system server 60. The modification system server 60 can maintain a database 64 of service stations locations that implement modifications. The database can also include weather prediction data, and trip information on particular autonomous vehicles. The database can also include information on geographic areas or zones that suggest or require vehicle modifications. For example, the database can include service stations and their locations that implement applying chains on tires. Such a database can also include trip information on routes including known roads where modification are mandatory, suggested, or not allowed, for example, where, or roads where, chains are mandatory, suggested, or not allowed. Such information can be used to ensure that the autonomous vehicle goes through a station that can apply or remove the modification. In one example, a criteria to determine if chains are required may include: sections of road where chains are mandatory at all times; sections of road where chains are not allowed at all times; sections of road where chains are recommended, along with specific road conditions weather criteria.

In one example where the modification includes the application of chains, if the road is known to be icy or snowy, or chains are recommended, for example, when there is a prediction for five or more centimeters of snow, the system can maximize the length of the trip where chains are removed or not on the tires, as chains on tires are known to reduce fuel efficiency and damage roads.

Continuing with the example of the application of chains to tires, once a route is planned or the route selected, and the vehicle reaches a service station for the application of chains, the vehicle can use a service station queuing lane to instruct an autonomous vehicle to queue the vehicle for the modification of adding chains to tires. Upon reaching a location where chains can be applied, the vehicle can wait for a signal from the service station that chains have been applied or removed, after which, the vehicle is ready to resume its route or course. The signal for directing the autonomous vehicle can be sent electronically via wired or wireless connections.

Figure 5:
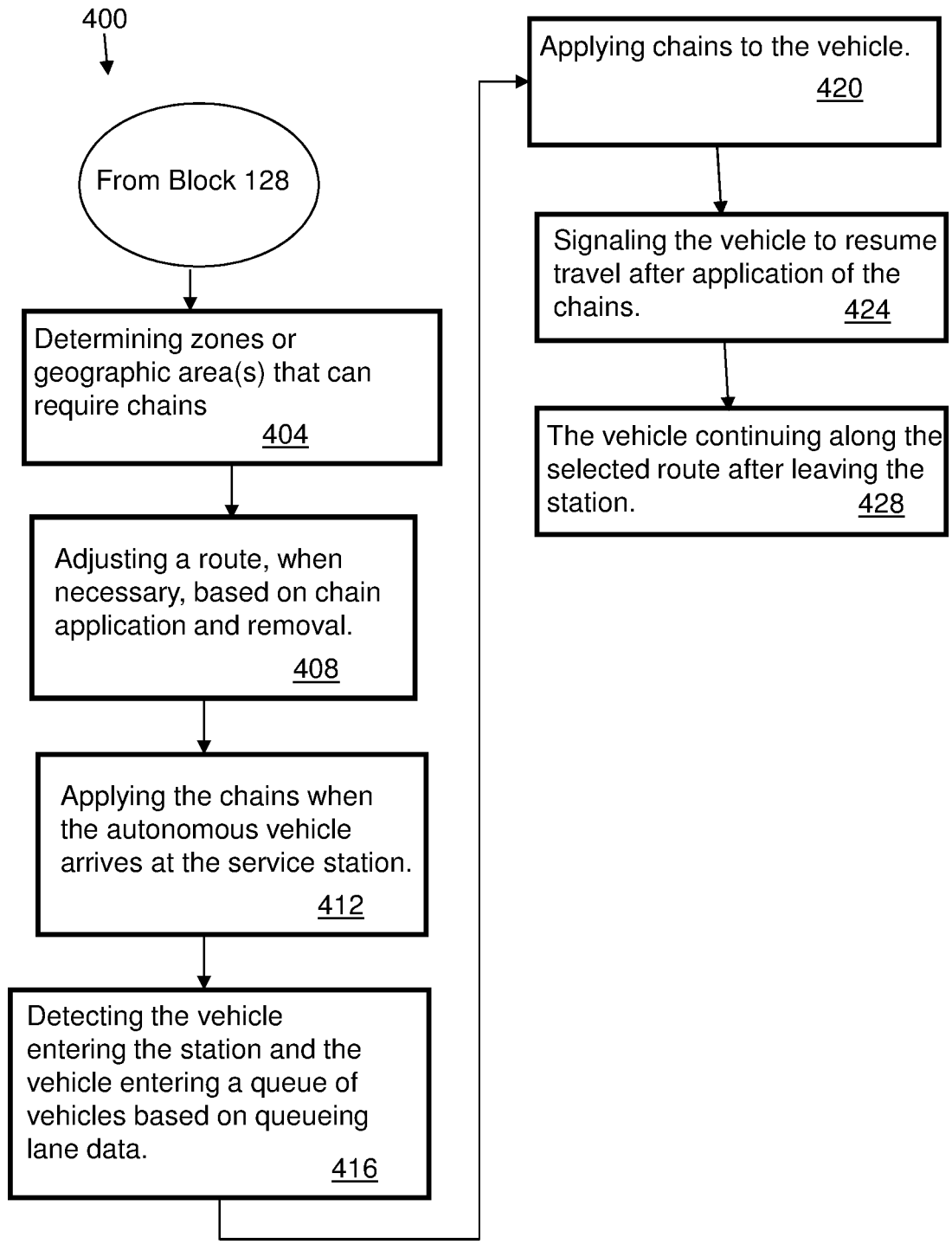
FIG. 5 is a flow chart of a method according to another embodiment of the disclosure which continues from the method of FIG. 2A.

Referring to FIG. 5, in one embodiment of the present disclosure, a method 400 includes a modification to an autonomous vehicle including adding chains to tires of the vehicle when required. The modification system service 60 can include a database 64 of trip information, and zones that may suggest or require a modification, i.e., chains in this example, based on weather prediction data which can also be part of the information in the database 64. The database can also include service stations which can apply chains to the tires of the vehicle. The method 400 continues from block 128 of method 100 shown in FIG. 2A. The method 400 includes determining zones or geographic area(s) that can require chains as in block 404. The zones or geographic area can be determines by the modification system server 60 (FIG. 1) communicating with the weather prediction system 30 (FIG. 1). Such determinations can be resolved on a real time basis or zones or areas that typically require tires can be stored, and updated in the database 64.

The method further includes adjusting a route, when necessary (based on the previous step), based on chain application and removal, as in block 408, to direct the vehicle to a service station. The autonomous vehicle arrives at the service station for application of the chains, as in block 412. The vehicle can enter a queue of vehicles based on queueing lane data and detection of the vehicle entering the station, as in block 416. The vehicle can then have the chains applied to the tires, at block 420. Upon receiving a signal to resume travel at block 424, the vehicle leaves the station to continue on the selected route, at block 428. The signal (block 424) can include various communications between the modification system server 60 and the vehicle computer 18 controlling the autonomous vehicle, for the vehicle to receive instruction from the modification system server 60, and respond to the instructions.

Thereby, the present disclosure includes a computer-implemented process or system for identifying a modification to an autonomous vehicle such as the use of chains on a self-driven or autonomous vehicle. In this example, the method or system, in response to having information comprising a database of all known chain application locations, trip information, including known roads where chains are one of mandatory, suggested or not allowed. The database can also include weather prediction data including current weather data, and the information can be used to determine whether the chains are required using criteria including sections of road where chains are mandatory at all times, sections of road where chains are not allowed at all times, sections of road where chains are recommended, and specific road conditions for the sections of road and weather criteria.

In response to a determination that the chains are required, further determining whether the chains are in a mandatory section of road or possibly not allowed on a section of road. The trip or route may be adjusted to direct the self-driven vehicle through a station that can apply chains. After the chains are applied to the vehicle, and the section of the trip or route is completed that requires chains (or approaching a section of the route that does not allow chains), the trip can be adjusted to direct the self-driven vehicle through a service station that can remove the chains. Upon completion of a chaining operation, including the application and removal of the chains to the tires, receiving a signal by the self-driven to resume the trip or route. The method can maximize the length of the trip without chains applied to the tires or with the removal of the chains, as gas mileage and speed of the vehicle can be adversely effected by the addition of chains to the tires.

Figure 6:
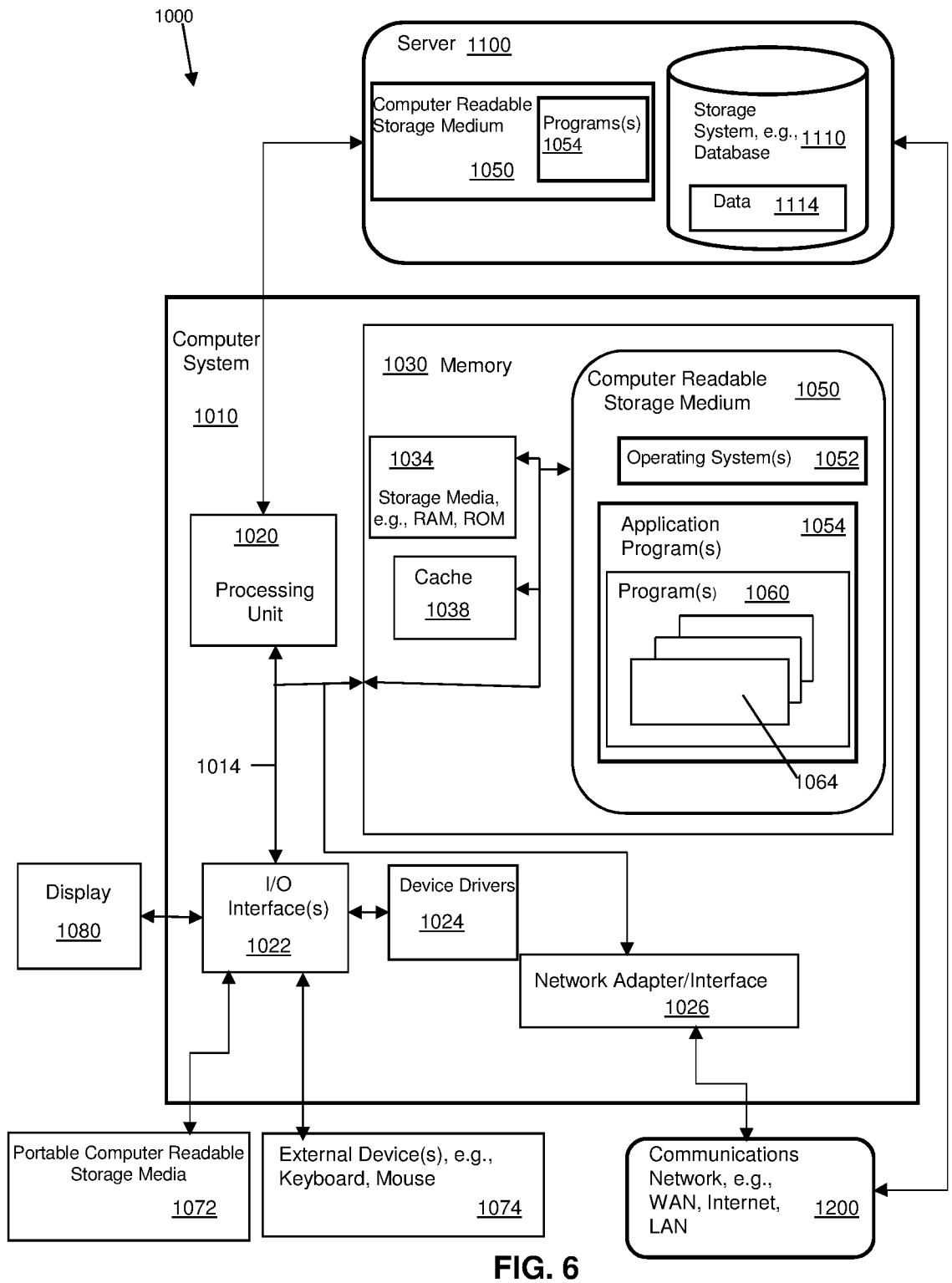
FIG. 6 is a schematic block diagram depicting a computer system according to an embodiment of the disclosure which includes a computer shown in FIG. 1, and cooperates with the system and methods shown in FIGS. 1, 2A, 2B, 3, 4, and 5.

The computer system discussed in the system 10, such as the navigation system computer, the vehicle computer, the weather prediction system computer, the dispatch computer, and the dispatch computer can include all or part of the computer system 1000 and computer 1010 shown in FIG. 6, which discloses a generic computer system 1000 and computer 1010. It is understood that the above disclosed computers/computer systems and the computer 1010 are representative or illustrative of many alternative computer devices and are presented here as generic representations for the purposes of the embodiments of the present invention. In the embodiment discussed above, for illustrative purposes, the method of the present disclosure can be embodied in a computer program 1060 (FIG. 6) or a software application stored on the computer 1010. The computer 1010 can all or in part represent the server 60. The server 60, in FIG. 1, is shown as a remote server to the autonomous vehicle dispatch 40 and the navigation system 20 and the weather prediction system 30, however, in other embodiment in accordance with the present disclosure, a computer program embodying the present method can be part of a computer system running locally in one or more of the illustrated components of the system 10 shown in FIG. 1. Further, a computer program embodying the present method can be cloud based or part of a cloud environment. In one embodiment such a cloud based system or environment can include all or part of the computer system 1000 (FIG. 6) and cloud based environment components shown in FIGS. 7 and 8. Alternative embodiments can include a computer program stored remotely (for example, on a remote server 1100 (FIG. 6)), and, for example, can be implemented as a service.

Referring to FIG. 6, a system or computer environment 1000 includes a computer system 1010 shown in the form of a generic computing device. The method 100, for example, may be embodied in a program 1060 embodied on a computer readable storage device, for example, generally referred to as memory 1030 and more specifically, computer readable storage medium 1050. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 shown in FIG. 6 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 6 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 6, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 100 (FIG. 2), for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
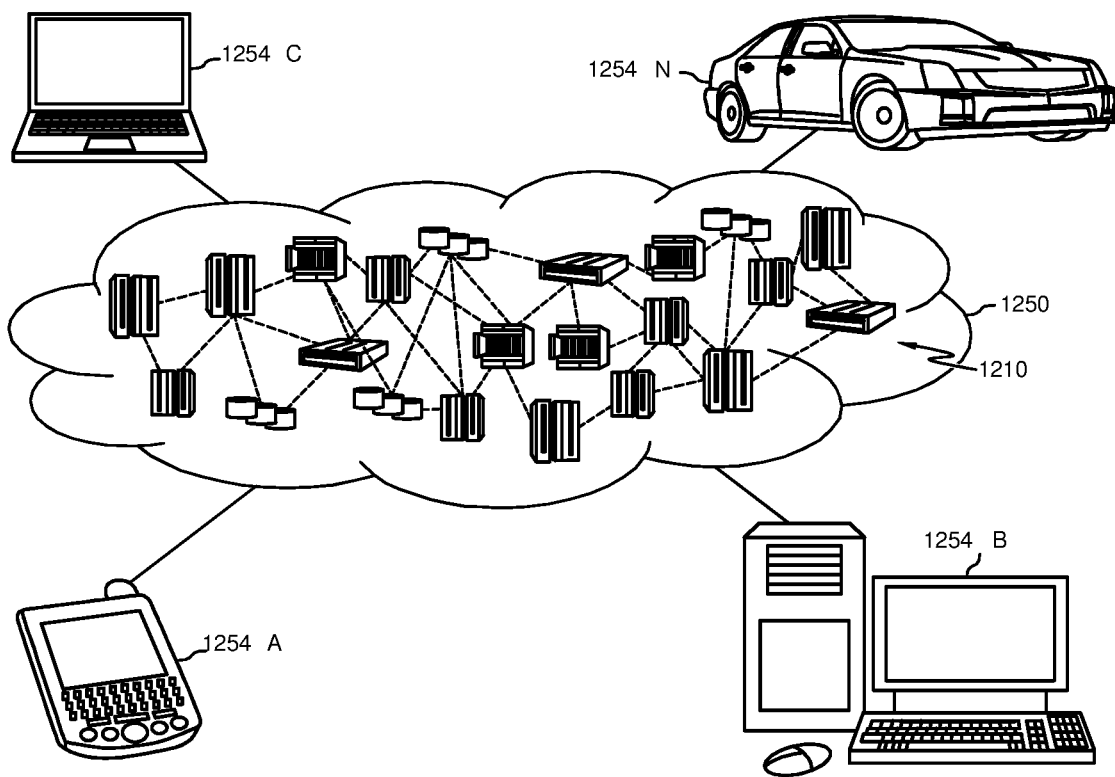
FIG. 7 is a functional block diagram depicting a cloud computing environment according to an embodiment of the present invention.

Referring now to FIG. 7, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 7 are intended to be illustrative only and that computing nodes 1210 and cloud computing environment 1250 can communicate with any type of computerized device over any type of network and/or network addressable connection (e.g., using a web browser).

Figure 8:
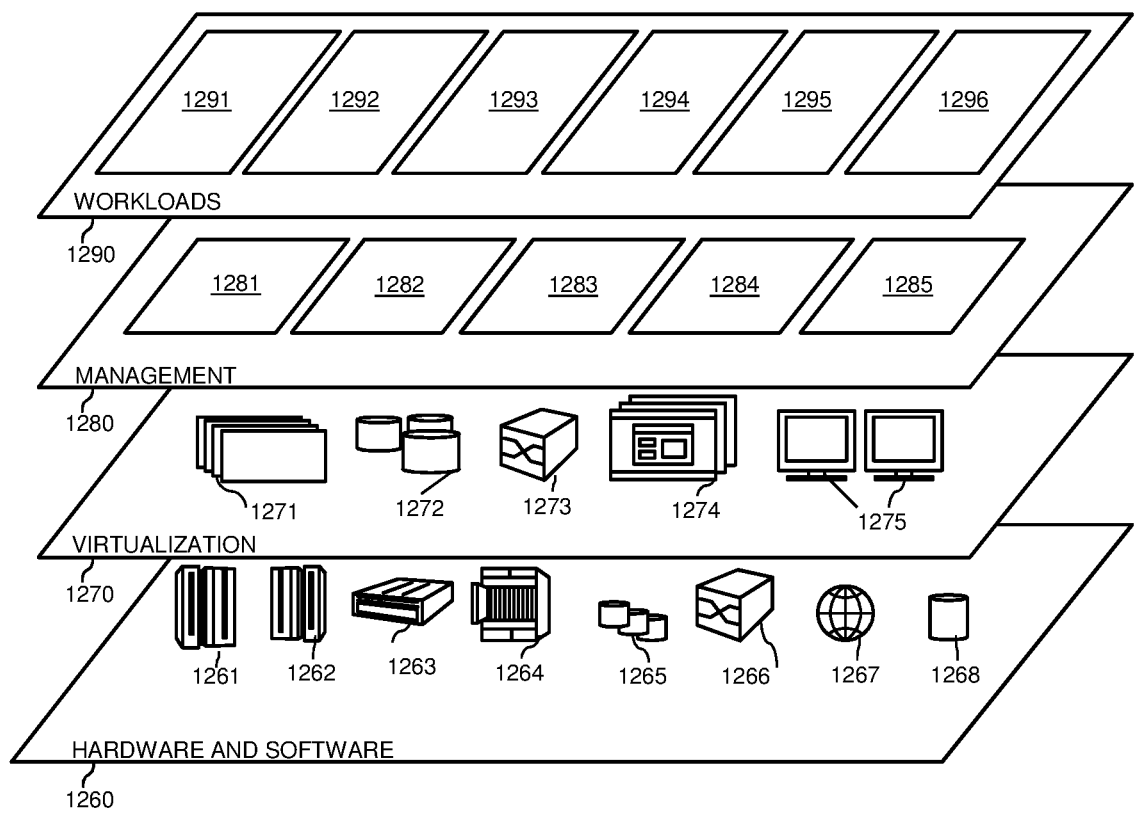
FIG. 8 is a diagram depicting abstraction model layers according to an embodiment of the present invention.

Referring now to FIG. 8, a set of functional abstraction layers provided by cloud computing environment 1250 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and assessing conditions and recommending modifications 1296.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for assessing environmental conditions outside an autonomous vehicle and recommending modifications for the autonomous vehicle based on a condition, comprising:

determining a plurality of possible routes for an autonomous vehicle using a navigational system having a computer communicating with a computer in the autonomous vehicle, the autonomous vehicle having a start location and a destination;

assessing environmental conditions outside the autonomous vehicle for each of the possible routes, the environmental conditions including weather conditions;

identifying one or more environmental conditions outside the autonomous vehicle related to each of the plurality of possible routes;

selecting a route from the start location to the destination based on the assessing of the environmental conditions and the identifying of the one or more environmental conditions, wherein the selecting of the route includes selecting one of the possible routes based on a criteria which includes avoiding a greatest number of the environmental conditions which necessitate a modification;

determining when the one or more environmental conditions necessitate the modification of the autonomous vehicle for traveling the selected route;

routing the autonomous vehicle along a first route adjustment to a first service station for implementing the modification based on the condition related to the selected route;

implementing the modification to the autonomous vehicle;

routing the autonomous vehicle along a first portion of the selected route including from the first service station to the selected route, the first portion of the selected route requires the modification along the selected route, in response to the modification being implemented at the first service station;

routing the autonomous vehicle along a second route adjustment to a second service station for reversing the modification; routing the autonomous vehicle along a second portion of the selected route including from the second service station to the selected route, in response to the modification being reversed at the second service station; and continuing the routing of the autonomous vehicle along the selected route to the destination.

2. The method of claim 1, wherein the criteria used in selecting one of the possible routes additionally includes determining which of the possible routes provides a longest travel distance without necessitating the modification.

3. The method of claim 1, further comprising:
implementing another route adjustment including routing of the autonomous vehicle to another service station for another modification based on a lack of the condition related to the selected route;
implementing the another modification to the autonomous vehicle including reversing the modification; and
implementing another route adjustment of the autonomous vehicle for continuing the routing of the autonomous vehicle along the selected route to the destination.

4. The method of claim 1, further comprising:
after the implementing of the modification to the autonomous vehicle, re-routing the autonomous vehicle to the destination, or implementing a second route adjustment of the selected route.

5. The method of claim 1, wherein the routing of the autonomous vehicle along the selected route and to the service station for implementing the modification based on the condition related to the selected route is a first selected route to a first service station, and the implementing the modification to the autonomous vehicle is a first modification based on a first condition related to the first selected route, and the method further comprising:
routing the autonomous vehicle along a second selected route and to a second service station for implementing a second modification based on a second condition related to the second selected route; and
implementing the second modification to the autonomous vehicle.

6. The method of claim 1, wherein the modification is to add chains to tires of the autonomous vehicle.

7. The method of claim 1, wherein the modification is to add chains to tires of the autonomous vehicle, and
wherein the routing of the autonomous vehicle along the first route adjustment to the service station for implementing the modification based on the condition related to the selected route to a first destination, and the implementing the modification to the autonomous vehicle is a first modification based on a first condition related to the first selected route to implement the adding of chains to the tires, and the method further comprising:
routing the autonomous vehicle along a second route adjustment to a second service station for implementing a second modification, wherein the second modification includes removing the chains from the tires; and
continuing the routing of the autonomous vehicle along the selected route to the destination after the second modification.

8. The method of claim 7, further comprising:
maximizing a length of a part of the selected route where the chains are not added or removed.

9. The method of claim 1, wherein the environmental conditions are selected from a group consisting of: weather conditions; temperature; road conditions; hill gradients; and road altitude.

10. A system for assessing environmental conditions outside an autonomous vehicle and recommending modifications for the autonomous vehicle based on a condition, the system comprising:
a computer system comprising: a computer processor, a computer-readable storage medium, and program instructions stored on the computer-readable storage medium being executable by the processor, to cause the computer system to perform a method, comprising:
determining a plurality of possible routes for an autonomous vehicle using a navigational system having a computer communicating with a computer in the autonomous vehicle, the autonomous vehicle having a start location and a destination;
assessing environmental conditions outside the autonomous vehicle for each of the possible routes, the environmental conditions including weather conditions;
identifying one or more environmental conditions outside the autonomous vehicle related to each of the plurality of possible routes;
selecting a route from the start location to the destination based on the assessing of the environmental conditions and the identifying of the one or more environmental conditions, wherein the selecting of the route includes selecting one of the possible routes based on a criteria which includes avoiding a greatest number of the environmental conditions which necessitate a modification;

determining when the one or more environmental conditions necessitate the modification of the autonomous vehicle for traveling the selected route;

routing the autonomous vehicle along a first route adjustment to a service station for implementing the modification based on the condition related to the selected route;

implementing the modification to the autonomous vehicle;

routing the autonomous vehicle along a first portion of the selected route including from the first service station to the selected route, the first portion of the selected route requires the modification along the selected route, in response to the modification being implemented at the first service station;

routing the autonomous vehicle along a second route adjustment to a second service station for reversing the modification;

routing the autonomous vehicle along a second portion of the selected route including from the second service station to the selected route, in response to the modification being reversed at the second service station; and continuing the routing of the autonomous vehicle along the selected route to the destination.

11. The system of claim 10, wherein the criteria used in selecting one of the possible routes additionally includes determining which of the possible routes provides a longest travel distance without necessitating the modification.

12. The system of claim 10 further comprising:
implementing another route adjustment including routing of the autonomous vehicle along the selected route to another service station for another modification based on a lack of the condition related to the selected route;
implementing the another modification to the autonomous vehicle including reversing the modification; and
implementing another route adjustment of the autonomous vehicle for continuing the routing of the autonomous vehicle along the selected route to the destination.

13. The system of claim 10, further comprising:
after the implementing of the modification to the autonomous vehicle, re-routing the autonomous vehicle to the destination, or implementing a second route adjustment of the selected route.

14. The system of claim 10, wherein the routing of the autonomous vehicle along the selected route and to the service station for implementing the modification based on the condition related to the selected route is a first selected route to a first service station, and the implementing the modification to the autonomous vehicle is a first modification based on a first condition related to the first selected route, and the method further comprising:
routing the autonomous vehicle along a second selected route and to a second service station for implementing a second modification based on a second condition related to the second selected route; and
implementing the second modification to the autonomous vehicle.

15. The system of claim 10, wherein the modification is to add chains to tires of the autonomous vehicle.

16. The system of claim 10, wherein the modification is to add chains to tires of the autonomous vehicle, and wherein the routing of the autonomous vehicle along the first route adjustment to the service station for implementing the modification based on the condition related to the selected route to a first destination, and the implementing the modification to the autonomous vehicle is a first modification based on a first condition related to the first selected route to implement the adding of chains to the tires, and the method further comprising:

routing the autonomous vehicle along a second route adjustment to a second service station for implementing a second modification, wherein the second modification includes removing the chains from the tires; and continuing the routing of the autonomous vehicle along the selected route to the destination after the second modification.

17. The system of claim 16, further comprising:
maximizing a length of a part of the selected route where the chains are not added or removed.

18. The system of claim 10, wherein the environmental conditions are selected from a group consisting of: weather conditions; temperature; road conditions; hill gradients; and road altitude.

19. A computer program product for assessing environmental conditions outside an autonomous vehicle and recommending modifications for the autonomous vehicle based on a condition, the program instructions executable by a computer to cause the computer to perform a method, comprising:

determining a plurality of possible routes for an autonomous vehicle using a navigational system having a computer communicating with a computer in the autonomous vehicle, the autonomous vehicle having a start location and a destination;

assessing environmental conditions outside the autonomous vehicle for each of the possible routes, the environmental conditions including weather conditions;

identifying one or more environmental conditions outside the autonomous vehicle related to each of the plurality of possible routes;

selecting a route from the start location to the destination based on the assessing of the environmental conditions and the identifying of the one or more environmental conditions, wherein the selecting of the route includes selecting one of the possible routes based on a criteria which includes avoiding a greatest number of the environmental conditions which necessitate a modification;

determining when the one or more environmental conditions necessitate the modification of the autonomous vehicle for traveling the selected route;

routing the autonomous vehicle along a first route adjustment to a service station for implementing the modification based on the condition related to the selected route;

implementing the modification to the autonomous vehicle;

routing the autonomous vehicle along a first portion of the selected route including from the first service station to the selected route, the first portion of the selected route requires the modification along the selected route, in response to the modification being implemented at the first service station;

routing the autonomous vehicle along a second route adjustment to a second service station for reversing the modification;

routing the autonomous vehicle along a second portion of the selected route including from the second service station to the selected route, in response to the modification being reversed at the second service station; and continuing the routing of the autonomous vehicle along the selected route to the destination.

20. The computer program product of claim 19, wherein the criteria used in selecting one of the possible routes additionally includes determining which of the possible routes provides a longest travel distance without necessitating the modification.

\* \* \* \* \*